United States Patent [19]

Mahlein

[11] Patent Number: 4,726,655

[45] Date of Patent: Feb. 23, 1988

[54] EDGE INTERFERENCE FILTER FOR OPTICAL COMMUNICATION TRANSMISSION IN WAVELENGTH-DIVISION MULTIPLEX

[75] Inventor: Hans F. Mahlein, Unterhaching, Fed. Rep. of Germany

[73] Assignee: Siemens Aktiengesellschaft, Berlin and Munich, Fed. Rep. of Germany

[21] Appl. No.: 906,212

[22] Filed: Sep. 12, 1986

[30] Foreign Application Priority Data

Sep. 17, 1985 [DE] Fed. Rep. of Germany ....... 3533169

[51] Int. Cl.[4] .............................................. G02B 5/28
[52] U.S. Cl. ..................... 350/166; 350/1.1; 350/1.6; 350/164
[58] Field of Search ................... 350/1.1, 1.6, 164, 166

[56] References Cited

U.S. PATENT DOCUMENTS

| | | | |
|---|---|---|---|
| 3,744,870 | 7/1973 | Tomiki et al. | 350/1.1 |
| 4,082,413 | 4/1978 | Austin et al. | 350/1.1 |
| 4,088,389 | 5/1978 | Zucker et al. | 350/166 |
| 4,271,358 | 6/1981 | Schwarz | 350/1.1 |
| 4,358,851 | 11/1982 | Scifres et al. | 350/166 |
| 4,556,599 | 12/1985 | Sato et al. | 350/164 |
| 4,568,140 | 2/1986 | Van Der Werf et al. | 350/166 |

OTHER PUBLICATIONS

Macleod, *Thin-Film Optical Filters*, 2nd Ed., MacMillan, New York, 1986, pp. 188-233, 334-342, 504-508.

*Primary Examiner*—John K. Corbin
*Assistant Examiner*—Martin Lerner
*Attorney, Agent, or Firm*—Hill, Van Santen, Steadman & Simpson

[57] ABSTRACT

An edge interference filter transmitting short-wave for great interchannel spacing of about 200 nm given an attenuation band wavelength of about 1300 nm. The filter is composed of a layer sequence of a total of 23 alternately high and low refractive index layers wherein the high index of refraction layers have an index of refraction of 2.08 and the low index of refraction layers have an index of approximately 1.45, the effective optical layer thickness of the individual layers is standardized to a 20° angle of incidence and to ¼ wavelength of the attenuation band center wavelength of 1260 nm with to layers 1 and 23 having a thickness of 1.146, layers 2 and 22 having a thickness of 0.909, layers 3 and 21 having a thickness of 1.039, layers 4 and 20 having a thickness of 0.932 and layers 5-19 having a thickness of 1.

1 Claim, 2 Drawing Figures

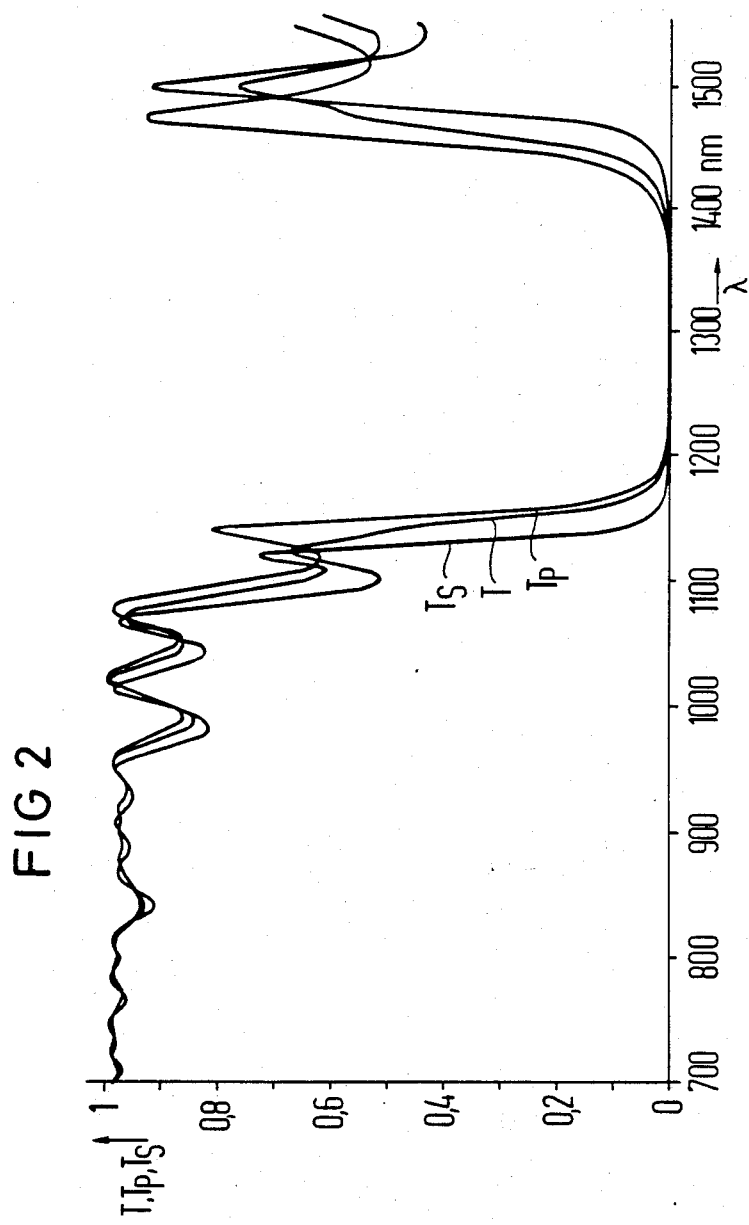

EDGE INTERFERENCE FILTER FOR OPTICAL COMMUNICATION TRANSMISSION IN WAVELENGTH-DIVISION MULTIPLEX

BACKGROUND OF THE INVENTION

The present invention is directed to an edge interference filter for an optical communication transmission in wavelength-multiplex. The edge interference filter has a layer sequence which is arranged between adjacent outer medias with the layer sequence being composed of alternately arranged layers with a high index of refraction and a low index of refraction with the two outer layers which are adjacent the outer media having the high index of refraction.

Filters of the species having a layer sequence of alternating layers of high and low index of refraction are known and examples are disclosed in an article by F. H. Mahlein, "A High Performance Edge Filter for Wavelength-Division Multi-Demultiplexer Units", *Optics and Laser Technology*, February 1981, pages 12–20. Under certain conditions, pairs of spectrally, complementary edge interference filters are required for optical communication transmission in wavelength-division multiplex. Such pairs in an unglued execution are known, for example, from a book by H. A. Macleod, *Thin Film Optical Filters*, Hilger, London, 1969, pages 111–153.

The theory of glued edge interference filters, such as mentioned in the article by Mahlein, show filters transmitting short-wave can be realized with a standard layer of material composed of $SiO_2$ and $TiO_2$ only for narrow interchannel spacings of about 40 nm given a wavelength of 1300 nm and a 20° angle of incidence. Filters transmitting long waves can only be realized with greater interchannel spacings of about 120 nm given a wavelength of 1300 nm and a 20° angle of incidence.

By contrast, edge interference filters transmitting long-wave for narrow interchannel spacing and filters transmitting short-wave for large interchannel spacings cannot be realized with the layer structures hitherto described.

SUMMARY OF THE INVENTION

The object of the present invention is to provide a glued edge interference filter transmitting short-wave for a greater interchannel spacing.

These objects are obtained in an improvement to an edge interference filter for optical communications, said interference filter comprising a layer sequence arranged between adjacent outer media, said layer sequence being composed of alternately arranged layers having a high index of refraction and a low index of refraction wherein the two outer layers of the layer sequence adjacent the outer medias are of a material of a high index of refraction. The improvements are that the layer sequence is composed of a total of 23 alternate layers, the layers of high index of refraction are composed of a material having an index of refraction of $2.08 \pm 0.05$ and the layers of low index refraction are composed of a material having an index of refraction of approximately $1.45 \pm 0.05$, said individual layers having a standard optical layer thickness of ¼ wavelength of an attenuation band center wavelength of 1260 nm at 20° angle of incidence, with the thicknesses having allowable deviation of at most 2%, the first and the twenty-third layers having a thickness of 1.146 of the standardized thickness, the second and twenty-second layers having a thickness of 0.909 of the standardized thickness, the third and twenty-first layers having a thickness of 1.039 of the standardized thickness, the fourth and twentieth layers having a thickness of 0.932 of the standardized thickness and the remaining fifth through nineteenth layers having a thickness of a constant 1 standardized thickness.

The filter of the invention advantageously exhibits a broad attenuation range of about 200 nm given an attenuation band center wavelength of about 1300 nm. It is advantageously employed for wave-division multiplex transmission with illuminescent diodes having an attenuation band center wavlengths of 830 nm and 1300 nm and an optical narrow band network, particulary a narrow band ISDN, which is being employed together with already existing, simpler, glued spectral complementary edge filters which are also employable in an optical broad band network, for example, a BIGFON.

BRIEF DESCRIPTION OF THE DRAWINGS

FIG. 2 is a graphical presentation of the measured transmittance of unpolarized radiation, s-component radiation and p-component radiation dependent on wavelength for the filter of the present invention.

DESCRIPTION OF THE PREFERRED EMBODIMENTS

Figure 1:
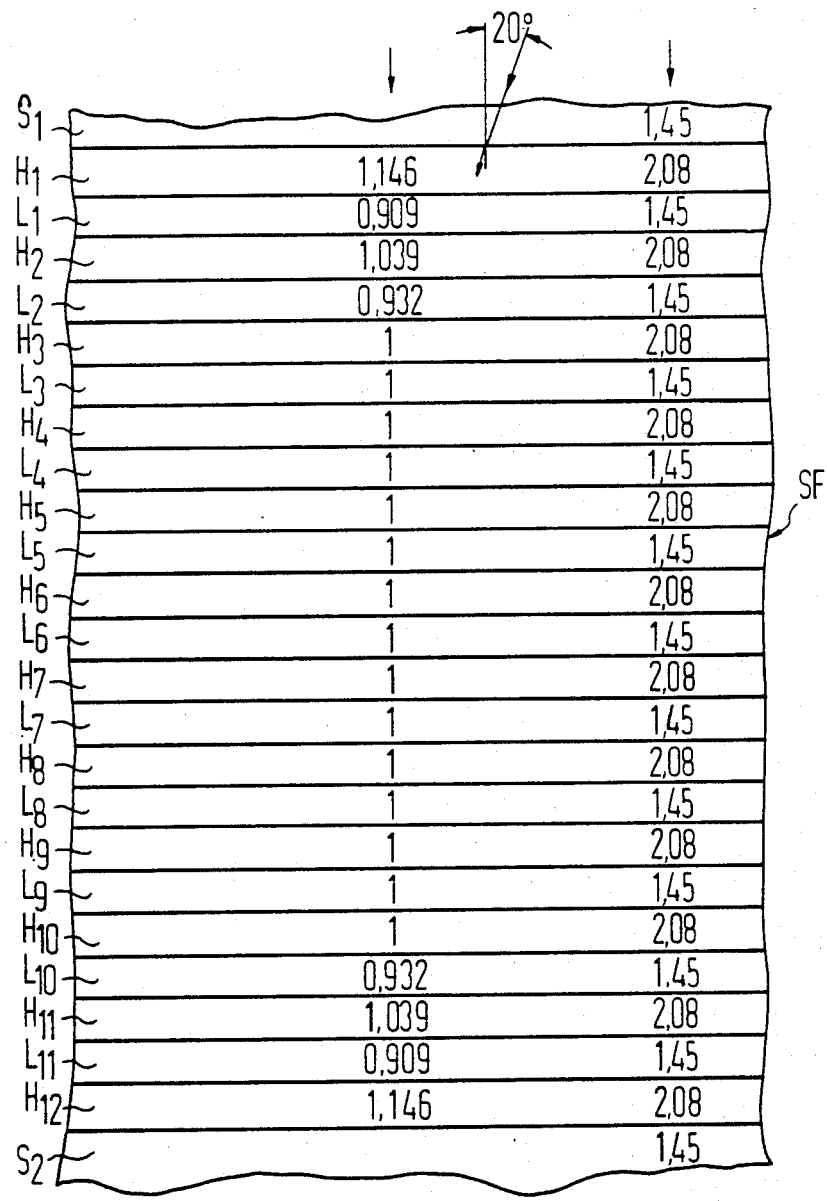
FIG. 1 is an enlarged partial side view of an inerference filter in accordance with the present invention.

The principles of the present invention are particulary useful in the edge interference filter illustrated in FIG. 1. The edge interference filter of FIG. 1 includes a layer sequence SF of 23 layers arranged between two outer media $S_1$ and $S_2$ with the layer sequence being composed of alternately arranged layers $H_1, H_2, H_3, \ldots, H_{11}$ and $H_{12}$ having a high index of refraction and layers $L_1, L_2, \ldots, L_{11}$ having a low index of refraction. The two outer layers $H_1$ and $H_{12}$ of the layer sequence SF which are immediately adjacent to the outer media $S_1$ and $S_2$ have a high index of refraction. The two outer medias $S_1$ and $S_2$ are composed of substrates, for example, a glass fiber core having a refractive index of $1.45 \pm 0.05$ or, respectivley, of superstrates, for example, a transparent optical adhesive having the same refractive index as the substrate.

The layers with the high index of refraction $H_1, H_2, \ldots, H_{11}$ and $H_{12}$ of the layer sequence SF are composed of material having a refractive index of $2.08 \pm 0.05$, for example, of $TiO_2$. The layers of the low refractive index $L_1, L_2, \ldots, L_{11}$ of the layer sequence SF are composed of a material having a refractive index of $1.45 \pm 0.05$, for example, a material of $SiO_2$ of which the substrate can also be composed.

Shown in roughly the horizontal middle of FIG. 1 for each of the layers $H_1, L_1, H_2, L_2, \ldots, H_{11}, L_{11}$ and $H_{12}$, is the effective optical layer thickness of ¼ wavelength of an attenuation band center wavelength of 1260 nm obtained at 20° angle of incidence. The refractive index of the medium $S_1$, of the individual layers of the layer sequence SF and for the medium $S_2$ are indicated below one another on the right side of the layer thickness.

In accordance therewith, the layer $H_1$ and $H_{12}$ each have a thickness of 1.146 of the standardized thickness. The layers $L_1$ and $L_{11}$ each have a thickness of 0.909 of the standardized layer thickness. The layers $H_2$ and $H_{11}$ each have a layer thickness of 1.039 of the standardized thickness and the layers $L_2$ and $L_{10}$ each have a layer thickness of 0.932 of the standardized thickness. The remaining layers $H_3$, $L_3$, $H_4$, $L_4$, ..., $H_9$, $L_9$ and $H_{10}$ each have a layer thickness of one standardized thickness.

The only layer thickness which differs from one another and from 1 are thus, the layer thicknesses of the first four layers, $H_1$, $L_1$, $H_2$, $L_2$ and the last four layers $L_{10}$, $H_{11}$, $L_{11}$ and $H_{12}$. The standardized thickness of the layers $H_3$, $L_3$, ..., $L_9$ and $H_{10}$ by contrast are constantly equal to 1. The variation of the layer thickness of the outermost four layers at both sides of the layer sequence SF is fully adequate in order to largely supress subsidiary reflection maxima in the spectral range between 700 nm and 920 nm. The attenuation band thereby remains practically unaltered.

For a vapor deposited in a glued filter of FIG. 1, FIG. 2 shows a spectral transmittance T for unpolarized radiation, the transmittance $T_s$ for the s-component, which is the component of the linear polarized radiation perpendicular to the plane of the incidence and the transmittance $T_p$ for the p-component, which is the component of radiation parallel to the plane of incidence showing them for the 20° angle of incidence. It can be seen from this graph that the attenuation band lies roughly between 1200 nm and 1400 nm.

The present filter can also be characterized in brief in the following by means of a formula-like symbolism:

S; 1.146 H; 0.909 L; 1.039 H; 0.932 L; $(HL)^7$; H; 0.932 L; 1.039 H; 0.909 L; 1.146 H; S

In this formula, S merely stands for the outer medium, H is for the layers having the higher index refraction and L stands for the layers having the lower index of refraction. The numbers preceding H and L indicate the above defined standardized layer thickness of the particular layer. No number preceding H or L denotes that the layer has a thickness of one standardized thickness. The power 7 indicates that the parenthetical expression of HL is repeated 7 times.

Although various minor modifications may be suggested by those versed in the art, it should be understood that I wish to employ within the scope of the patent granted hereon, all such modifications as reasonably and properly come within the scope of my contribution to the art.

I claim:

1. In an edge interference filter for optical communication transmission in wavelength-division multiplex, said filter comprising a layer sequence arranged between adjacent outer media, said layer sequence being composed of alternately arranged layers with high index of refraction and layers with low index of refraction wherein the two outer layers of the layer sequence adjacent to the outer media are layers of the high index of refraction, the improvements comprising said layer sequence being composed of a total of 23 alternate layers, each of the high index of refraction layers being composed of a material having an index of refraction of 2.08±0.05, each of the low index refraction layers being composed of a material having an index of refraction of 1.45±0.05, the individual layers have an optical layer thickness standardized at ¼ wavelength of an attenuation band center wavelength of 1260 nm at a 20° angle of incidence with the thickness of the layers having an allowable deviation of at most 2%, said layers having the following thicknesses, the first and twenty-third layers having a thickness of 1.146 of the standardized thickness, the second and twenty-second layers having a layer thickness of 0.909 of the standardized thickness, the third and twenty-first layers having a layer thickness of 1.039 of the standardized thickness, the fourth and twentieth layers having a layer thickness of 0.932 of the standardized thickness and the remaining fifth through nineteenth layers having a constant thickness of one standardized thickness.

* * * * *